(12) United States Patent
Hikmet et al.

(10) Patent No.: US 10,012,779 B2
(45) Date of Patent: Jul. 3, 2018

(54) LIGHT EMITTING DEVICE

(71) Applicant: PHILIPS LIGHTING HOLDING B.V., Eindhoven (NL)

(72) Inventors: Rifat Ata Mustafa Hikmet, Eindhoven (NL); Ties Van Bommel, Horst (NL); Durandus Kornelius Dijken, Eindhoven (NL); Dominique Maria Bruls, Heeze (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 65 days.

(21) Appl. No.: 15/031,170

(22) PCT Filed: Oct. 11, 2014

(86) PCT No.: PCT/EP2014/071823
§ 371 (c)(1),
(2) Date: Apr. 21, 2016

(87) PCT Pub. No.: WO2015/058979
PCT Pub. Date: Apr. 30, 2015

(65) Prior Publication Data
US 2016/0266297 A1    Sep. 15, 2016

(30) Foreign Application Priority Data
Oct. 25, 2013  (EP) .................................... 13190329

(51) Int. Cl.
*F21V 7/04* (2006.01)
*F21V 8/00* (2006.01)
(Continued)

(52) U.S. Cl.
CPC .............. *G02B 6/0003* (2013.01); *F21V 9/16* (2013.01); *F21V 9/30* (2018.02); *G02B 5/08* (2013.01);
(Continued)

(58) Field of Classification Search
CPC ........ G02B 6/0003; G02B 5/08; G02B 6/005; G02B 6/0068; G02B 6/0078; G02B 6/008;
(Continued)

(56) References Cited

U.S. PATENT DOCUMENTS

| | | | |
|---|---|---|---|
| 5,195,104 A | 3/1993 | Geiger et al. | |
| 2003/0090632 A1* | 5/2003 | Kim et al. | G02B 27/0905 353/31 |

(Continued)

FOREIGN PATENT DOCUMENTS

| | | |
|---|---|---|
| WO | 2006099732 A1 | 9/2006 |
| WO | 2007036887 A1 | 4/2007 |
| WO | 2010084187 A1 | 7/2010 |

*Primary Examiner* — Y M. Lee

(57) ABSTRACT

In various embodiments a light emitting device is disclosed comprising a first and second source for emitting light with a first and a second spectral distribution, respectively, a first and second light guides comprising a first light input surface and a first light exit surface, respectively, the light input surface and the light exit surface of the respective light guide extending at an angle with respect to each other. The first and second light guide configured to convert a part of the received light to light with a third and fourth spectral distribution, respectively, and couple at least a part of the light with the third and fourth spectral distribution out of the first and second light exit surface, respectively. The light have the first and the second spectral distribution having different spectral distributions, and the light having the third and the fourth spectral distribution have different spectral distributions.

14 Claims, 8 Drawing Sheets

(51) Int. Cl.
*F21V 9/30* (2018.01)
*G02B 26/00* (2006.01)
*G02B 27/09* (2006.01)
*G02B 19/00* (2006.01)
*F21V 9/16* (2006.01)
*G02B 5/08* (2006.01)
*F21K 9/61* (2016.01)
*F21Y 115/10* (2016.01)
*F21Y 101/00* (2016.01)

(52) U.S. Cl.
CPC .............. *G02B 6/005* (2013.01); *G02B 6/008* (2013.01); *G02B 6/0068* (2013.01); *G02B 6/0078* (2013.01); *G02B 19/0047* (2013.01); *G02B 26/008* (2013.01); *G02B 27/0994* (2013.01); *F21K 9/61* (2016.08); *F21Y 2101/00* (2013.01); *F21Y 2115/10* (2016.08)

(58) Field of Classification Search
CPC .............. G02B 19/0047; G02B 26/008; G02B 27/0994; G02B 6/0076; G02B 6/0085; G02B 6/0031; G02B 6/0046; F21V 9/16; F21K 9/61

See application file for complete search history.

(56) References Cited

U.S. PATENT DOCUMENTS

| | | | |
|---|---|---|---|
| 2005/0226303 A1 | 10/2005 | Suzudo et al. | |
| 2006/0001036 A1* | 1/2006 | Jacob et al. | G02B 6/0003 257/98 |
| 2008/0285310 A1* | 11/2008 | Aylward | G02B 6/001 362/626 |
| 2010/0246170 A1* | 9/2010 | Yang | G02B 6/0001 362/235 |
| 2010/0302770 A1 | 12/2010 | Lee et al. | |
| 2012/0051688 A1 | 3/2012 | Pitwon | |
| 2012/0243563 A1 | 9/2012 | Goldberg | |
| 2015/0377435 A1* | 12/2015 | Liu et al. | F21S 11/007 362/552 |

\* cited by examiner

LIGHT EMITTING DEVICE

CROSS-REFERENCE TO PRIOR APPLICATIONS

This application is the U.S. National Phase application under 35 U.S.C. § 371 of International Application No. PCT/EP2014/071823, filed on Oct. 11, 2014, which claims the benefit of European Patent Application No. 13190329.6, filed on Oct. 25, 2013. These applications are hereby incorporated by reference herein.

FIELD OF THE INVENTION

The invention relates to a light emitting device comprising a light source adapted for, in operation, emitting light with a spectral distribution and a light guide adapted for converting the light with the spectral distribution to light with another spectral distribution.

BACKGROUND OF THE INVENTION

Document WO 2010/084187 A1 describes a spotlight comprising LED modules, each LED module comprising at least two LEDs and a light mixer configured to receive LED light at one end surface, mix the different light emission spectra of the at least two LEDs and emit the mixed light from the opposite end surface. The mixers are arranged next to each other such as to emit one common beam of light. The mixers may be light guides.

High intensity light sources, and particularly white high intensity light sources, are interesting for various applications including spots, headlamps, stage-lighting and digital light projection. For such purposes, it is possible to make use of so-called luminescent concentrators where shorter wavelength light is converted to longer wavelengths in a highly transparent luminescent material. Such a transparent luminescent material can be used and is illuminated by LEDs to produce longer wavelengths within the luminescent material. Converted light, which will be waveguided in the luminescent material, is extracted from a surface leading to an intensity gain or, in other words, an increase in brightness.

The light output can in this case be increased by coupling in more light by making the light guide longer and increasing the number of LEDs that is used to illuminate the luminescent concentrator. However, as a result of self-absorption in the luminescent material as well as increased light outcoupling due to the LEDs, the larger, and particularly the longer, the light guide is, the more light will be lost, which in turn leads to a decrease in the intensity gain of the light emitted by the light guide and thus the light emitting device. Thus, the scalability of the light emitting device is radically decreased.

SUMMARY OF THE INVENTION

It is an object of the present invention to overcome this problem, and to provide a light emitting device with an improved scalability and with which a high intensity output may be obtained and light losses may be lowered or even eliminated also for light emitting devices comprising relatively large and/or long light guides.

According to a first aspect of the invention, this and other objects are achieved by means of a light emitting device comprising at least one first light source adapted for, in operation, emitting light with a first spectral distribution, at least one second light source adapted for, in operation, emitting light with a second spectral distribution, a first light guide comprising a first light input surface and a first light exit surface, the first light input surface and the first light exit surface extending at an angle different from zero with respect to each other, and a second light guide comprising a second light input surface and a second light exit surface, the second light input surface and the second light exit surface extending at an angle different from zero with respect to each other, the first light guide being adapted for receiving the light with the first spectral distribution from the at least one first light source at the first light input surface, guiding the light to the first light exit surface, converting at least a part of the light with the first spectral distribution to light with a third spectral distribution and coupling at least a part of the light with the third spectral distribution out of the first light exit surface, and the second light guide being adapted for receiving the light with the second spectral distribution from the at least one second light source at the second light input surface, guiding the light to the second light exit surface, converting at least a part of the light with the second spectral distribution to light with a fourth spectral distribution and coupling at least a part of the light with the fourth spectral distribution out of the second light exit surface, wherein the light having the third spectral distribution and the light having the fourth spectral distribution have different spectral distributions.

By providing a light emitting device with at least two light guides each having a light input surface and a light exit surface extending at an angle different from zero with respect to each other, and furthermore by providing a separate light source for each light guide, a light emitting device is obtained with which more light is coupled into the light guide and with which more light is guided towards the respective light exit surfaces by means of Total Internal Reflection (TIR). This in turn considerably lowers the amount of light lost by exiting the light guide through other surfaces than the light exit surface and thus increases the intensity of the light emitted through the respective light exit surface. As this applies for even relatively large light guides, a light emitting device having a considerably improved scalability is provided.

By providing light guides being adapted for converting at least a part of the incoupled light to converted light with a different spectral distribution, a light guide is provided with which a particularly large amount of the converted light will stay in the light guide and can then be extracted from one of the surfaces, which in turn leads to a particularly high intensity gain. This also contributes to improving the scalability of the light emitting device.

By providing that the light having the third spectral distribution and the light having the fourth spectral distribution have different, for example partially overlapping or substantially non-overlapping, spectral distributions, a light emitting device is provided which is particularly suitable for providing a white light output of a high quality and intensity, for example by mixing the light emitted by and exiting from the first and the second light guide, for example with a suitable optical element. In further embodiments the third spectral distribution and the fourth spectral distribution are both comprised in the range from 400 nm to 800 nm.

In an embodiment the light having the first spectral distribution and the light having the second spectral distribution have different spectral distributions, for example partially overlapping or substantially non-overlapping, spectral distributions. In this way a larger flexibility in achieving a predetermined mixture of light is achieved. In further embodiments the first spectral distribution and the second spectral distribution are both comprised in the range from 200 nm to 500 nm.

In an embodiment the first light guide and the second light guide are arranged extending parallel to one another in such a way that the first light input surface and the second light input surface are arranged side by side and facing in the same direction. This contributes to an optimal mixing of the output light emitted by and exiting from the first and the second light guide.

In an embodiment at least one of the first light input surface and the first light exit surface and the second light input surface and the second light exit surface, respectively, extend perpendicular to one another.

By providing a light emitting device with at least two light guides each having a light input surface and a light exit surface extending perpendicular to each other a light emitting device is obtained with which more light is coupled into the light guide and with which an optimally large amount of light is guided towards the respective light exit surfaces by means of TIR. This in turn further lowers the amount of light lost by exiting the light guide through other surfaces than the light exit surface and thus further increases the intensity of the light emitted through the respective light exit surface. As this applies for even relatively large light guides, a light emitting device having a particularly high scalability is provided.

In an embodiment the first light guide comprises a material capable of converting at least a part of the light with the first spectral distribution to light with a third spectral distribution, and wherein the second light guide comprises a material capable of converting at least a part of the light with the second spectral distribution to light with a fourth spectral distribution.

Thereby a light emitting device is provided having a particularly simple structure and being easy and cheap to manufacture.

In an embodiment the material capable of converting at least a part of the light with the first spectral distribution to light with the third spectral distribution is arranged at a surface of the first light guide.

In an embodiment the material capable of converting at least a part of the light with the second spectral distribution to light with the fourth spectral distribution is arranged at a surface of the second light guide.

Thereby a light emitting device is provided with which the light source light is converted before or upon entering a light guide. This has the advantage that less or even no light is absorbed while propagating through the light guides as a minimum of or even no material adapted for converting light is arranged within the light guides.

In an embodiment the first light guide and the second light guide comprise any one of a transparent material, a luminescent material, a garnet and any combination thereof.

For instance, in an embodiment the first light guide is a transparent light guide. The term "transparent material" in this used in the text refer to the scattering property of the material and thus not to the absorbance of the material. Thus the material may be highly absorbing but show high transparency. The transparency can be measured by using a wavelength where the material shows no, or negligible, absorption. A parallel beam of light can be used and the transmitted intensity can be measured by integrating over an angular range extending up to 2 degrees before and after placing the sample in the beam. In the calculation interface reflection losses must be subtracted. Preferably, the transparent material is a material comprising a transparency of preferably more than 80%, more preferably more than 90%, most preferably more than 95% at least in the spectral ranges of excitation and emission.

By providing a light guide comprising a transparent material, a light emitting device is provided with which the loss of light is further lowered as less or even no light is absorbed in the light guides. It is noted that the material or combination of materials of the first and second light guide, respectively, may be identical or may just as well be different.

By providing a light guide comprising a transparent material, a light emitting device is provided with which the loss of light is further lowered as less or even no light is absorbed in the light guides.

By providing a light guide comprising a luminescent material a light emitting device is provided having particularly good and efficient light converting properties.

By providing a light guide comprising a garnet or other transparent luminescent material a light emitting device is provided having particularly good and efficient light guiding properties.

In an embodiment at least one of the first light guide and the second light guide is transparent and comprises a luminescent element arranged at a surface of the light guide.

Thereby a light emitting device having a particularly simple structure is provided having both an improved collection of non-converted light and particularly good and efficient light converting properties.

In an embodiment the first light guide furthermore is adapted for coupling at least a part of the light with the third spectral distribution out of a surface which extends parallel to and is opposite to the first light exit surface.

In an embodiment the second light guide furthermore is adapted for coupling at least a part of the light with the fourth spectral distribution out of a surface which extends parallel to and is opposite to the second light exit surface.

These embodiments provide for a light emitting device with which it is possible to use light emitted from both ends of the first and/or second light guide and with which emission of light from the first and/or second light guide in more than one direction is enabled, possibly even with the emission of light with different spectral distributions in different directions.

In an embodiment at least one of the first light exit surface, the surface extending parallel with and opposite to the first light exit surface, the second light exit surface and the surface extending parallel with and opposite to the second light exit surface is provided with a mirror, or reflective, element.

Thereby a light emitting device is provided with which the intensity of the light emitted is particularly high as the provision of such mirrors ensure that an even smaller amount of light is lost.

In an embodiment at least one of the first light guide and the second light guide comprise a surface roughness of preferably less than 500 nm, more preferably less than 100 nm and most preferably less than 50 nm.

Thereby a light emitting device is provided having light guides provided with particularly good conditions for guiding light by TIR as surface roughness and impurities, which may otherwise enhance the coupling of light out of the light guide, are avoided.

In an embodiment the first light guide and the second light guide have different sizes and/or shapes.

Thereby a light emitting device is provided with a useful parameter for obtaining different geometrical configurations of the light emitting device and/or of the size and shape of the beam of light emitted by the light emitting device.

In an embodiment the light emitting device further comprises an optical element arranged at the first and second light exit surface for mixing light exiting from the first light exit surface with light exiting from the second light exit surface. In this way light emitting device is provided which, for example, emits white light with a relatively high intensity.

In an embodiment the light emitting device further comprises one or more further light guides comprising a further light input surface and a further light exit surface, the further light input surface and the further light exit surface extending at an angle different from zero with respect to each other, the one or more further light guides being adapted for receiving and coupling in incident light at the further light input surface, guiding the incident light to the further light exit surface, converting at least a part of the incident light to converted light with a spectral distribution being different from that of the incident light and coupling the converted light out of the further light exit surface.

In an embodiment the light emitting device further comprises at least one further light source adapted for, in operation, emitting light with a further spectral distribution, the one or more further light guides being adapted for receiving and coupling in the light with the further spectral distribution.

These embodiments provide for a light emitting device emitting light with an even higher intensity or brightness and having an even more improved scalability, particularly as the emitting surface area may simply be increased by adding further light guides to the light emitting device. Furthermore, these embodiments provide for further parameters usable for obtaining different geometrical configurations of the light emitting device and/or of the size and shape of the beam of light emitted by the light emitting device.

The invention further relates to a lamp, luminaire or digital projection device comprising a light emitting device according to the invention.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

Figure 1:
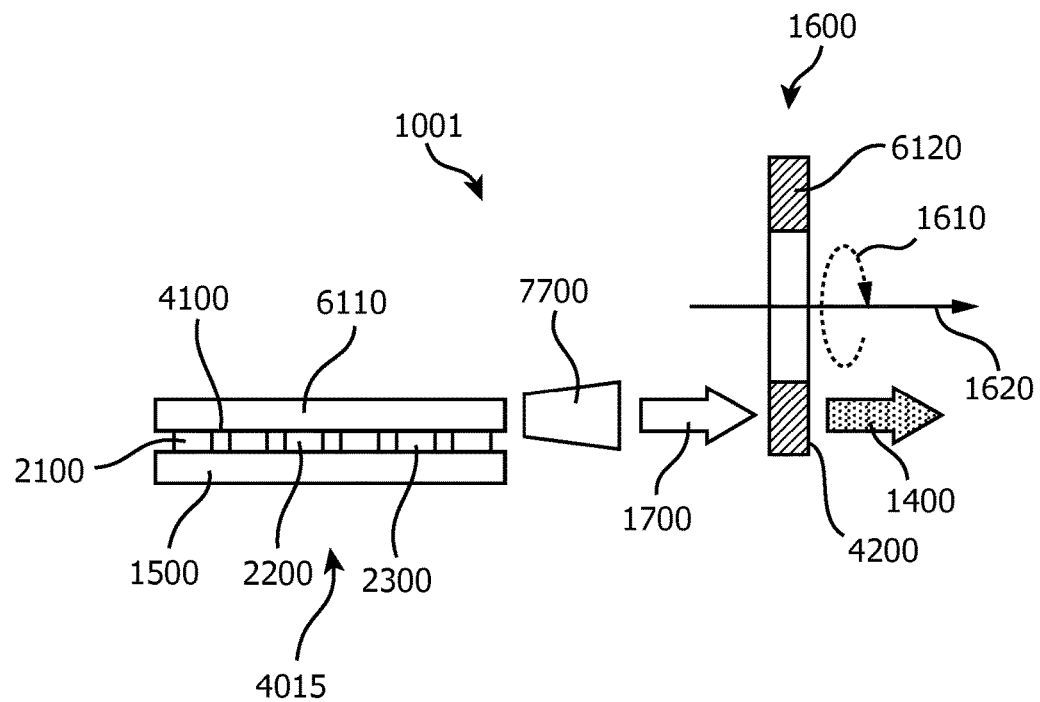
FIG. 1 shows a cross sectional view of a light emitting device comprising a phosphor wheel.

As illustrated in the figures, the sizes of layers, elements and regions are exaggerated for illustrative purposes and, thus, are provided to illustrate the general structures of embodiments of the present invention. Like reference numerals refer to like elements throughout, such that e.g. a light emitting device according to the invention is generally denoted 1, whereas different specific embodiments thereof are denoted by adding 01, 02, 03 and so forth to the general reference numeral. With regard to FIGS. 1 to 6 showing a number of features and elements which may be added to any one of the embodiments of a light emitting device according to the invention as set forth further below, generally "00" has been added to all elements except those specific to one of these Figures.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The following description will start with general considerations regarding applications, suitable light sources and suitable materials for various elements and features of a light emitting device according to the invention. For this purpose a number of features and elements which may be added to any one of the embodiments of a light emitting device according to the invention as set forth further below will be described with reference to FIGS. 1 to 6. The specific embodiments of a light emitting device according to the invention will be described in detail with reference to FIGS. 7 to 12.

A light emitting device according to the invention may be used in applications including but not being limited to a lamp, a light module, a luminaire, a spot light, a flash light, a projector, a digital projection device, automotive lighting such as e.g. a headlight or a taillight of a motor vehicle, arena lighting, theater lighting and architectural lighting.

Light sources which are part of the embodiments according to the invention as set forth below, are adapted for, in operation, emitting light with a first spectral distribution. This light is subsequently coupled into a light guide or waveguide. The light guide or waveguide may convert the light of the first spectral distribution to another spectral distribution and guides the light to an exit surface. The light source may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source light in the blue color-range which is defined as a wavelength range of between 380 nm and 495 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light source may be a red light source, i.e. emitting in a wavelength range of e.g. between 600 nm and 800 nm. Such a red light source may be e.g. a light source of any of the above mentioned types directly emitting red light or provided with a phosphor suitable for converting the light source light to red light. This embodiment is particularly advantageous in combination with a light guide adapted for converting the light source light to infrared (IR) light, i.e. light with a wavelength of more than about 800 nm and in a suitable embodiment with a peak intensity in the range from 810 to 850 nm. In an embodiment such a light guide comprises an IR emitting phosphor. A light emitting device with these characteristics is especially advantageous for use in night vision systems, but may also be used in any of the applications mentioned above.

Another example is combination of a first, red light source emitting light in a wavelength range between 480 nm and 800 nm and coupling this light into a luminescent rod or waveguide, and a second light source, emitting blue or UV or violet light, i.e. with a wavelength smaller than 480 nm, and also coupling its emitted light into the luminescent waveguide or rod. The light of the second light source is converted by the luminescent waveguide or rod to a wavelength range between 480 nm and 800 nm, and the light of the first light source coupled into the luminescent waveguide or rod will not be converted. In other words, the second light source emits UV, violet or blue light and is subsequently converted by the luminescent concentrator into light in the green-yellow-orange-red spectral region. In another embodiment the first light source emits in a wavelength range between 500 nm and 600 nm, and the light of the second light source is converted by the luminescent waveguide or rod to a wavelength range between 500 nm and 600 nm. In another embodiment the first light source emits in a wavelength range between 600 nm and 750 nm, and the light of the second light source is converted by the luminescent waveguide or rod to a wavelength range between 600 nm and 750 nm. In an embodiment the light of the first light source is coupled into the luminescent waveguide or rod at another surface, for example a surface opposite to an exit surface of the light, than a surface where the light of the second light source is coupled into the luminescent waveguide or rod. These embodiments provide a luminescent waveguide or rod emitting in the red light range with an increased brightness.

The light guides as set forth below in embodiments according to the invention generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Transparent light guides may in embodiments comprise a transparent substrate on which a plurality of light sources, for example LEDs, are grown epitaxially. The substrate is in embodiments a single crystal substrate, such as for example a sapphire substrate. The transparent growth substrate of the light sources is in these embodiments the light concentrating light guide.

The generally rod shaped or bar shaped light guide can have any cross sectional shape, but in embodiments has a cross section the shape of a square, rectangle, round, oval, triangle, pentagon, or hexagon. Generally the light guides are cuboid, but may be provided with a different shape than a cuboid, with the light input surface having somewhat the shape of a trapezoid. By doing so, the light flux may be even enhanced, which may be advantageous for some applications.

The light guides may also be cylindrically shaped rods. In embodiments the cylindrically shaped rods have one flattened surface along the longitudinal direction of the rod and at which the light sources may be positioned for efficient incoupling of light emitted by the light sources into the light guide. The flattened surface may also be used for placing heat sinks. The cylindrical light guide may also have two flattened surfaces, for example located opposite to each other or positioned perpendicular to each other. In embodiments the flattened surface extends along a part of the longitudinal direction of the cylindrical rod.

The light guides as set forth below in embodiments according to the invention may also be folded, bended and/or shaped in the length direction such that the light guide is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light guide of which the total length, along which generally the light is guided, is relatively large, leading to a relatively high lumen output, but can at the same time be arranged into a relatively small space. For example luminescent parts of the light guide may be rigid while transparent parts of the light guide are flexible to provide for the shaping of the light guide along its length direction. The light sources may be placed anywhere along the length of the folded, bended and/or shaped light guide.

Suitable materials for the light guides as set forth below according to embodiments of the invention are sapphire, polycrystalline alumina and/or undoped transparent garnets such as YAG, LuAG having a refractive index of n=1.7. An additional advantage of this material (above e.g. glass) is that it has a good thermal conductivity, thus diminishing local heating. Other suitable materials include, but are not limited to, glass, quartz and transparent polymers. In other embodiments the light guide material is lead glass. Lead glass is a variety of glass in which lead replaces the calcium content of a typical potash glass and in this way the refractive index can be increased. Ordinary glass has a refractive index of n=1.5, while the addition of lead produces a refractive index ranging up to 1.7.

The light guides as set forth below according to embodiments of the invention may comprise a suitable luminescent material for converting the light to another spectral distribution. Suitable luminescent materials include inorganic phosphors, such as doped YAG, LuAG, organic phosphors, organic fluorescent dyes and quantum dots which are highly suitable for the purposes of embodiments of the present invention as set forth below.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in embodiments of the present invention as set forth below. However, it may be preferred for reasons of environmental safety and concern to use cadmium-free quantum dots or at least quantum dots having very low cadmium content.

Organic fluorescent dyes can be used as well. The molecular structure can be designed such that the spectral peak position can be tuned. Examples of suitable organic fluorescent dyes materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

The luminescent material may also be an inorganic phosphor. Examples of inorganic phosphor materials include, but are not limited to, cerium (Ce) doped YAG ($Y_3Al_5O_{12}$) or LuAG ($Lu_3Al_5O_{12}$). Ce doped YAG emits yellowish light, whereas Ce doped LuAG emits yellow-greenish light. Examples of other inorganic phosphors materials which emit red light may include, but are not limited to ECAS and BSSN; ECAS being $Ca_{1-x}AlSiN_3$:Eu$x$ wherein $0<x\leq1$, in other embodiments $0<x\leq0.2$; and BSSN being $Ba_{2-x-z}M_xSi_{5-y}Al_yN_{8-y}O_y$:Eu$_z$ wherein M represents Sr or Ca, $0\leq x\leq 1$, $0<y\leq 4$, and $0.0005\leq z\leq 0.05$, and in embodiments $0\leq x\leq 0.2$.

In embodiments of the invention as set forth below, the luminescent material is made of material selected from the group comprising $(M<I>_{(1-x-y)}M<II>_x M<III>_y)_3 (M<IV>_{(1-z)} M<V>_z)_5 O_{12}$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu or mixtures thereof, M<IV> is Al, M<V> is selected from the group comprising Ga, Sc or mixtures thereof, and $0<x\leq1$, $0<y\leq0.1$, $0<z<1$, $(M<I>_{(1-x-y)} M<II>_x M<III>_y)_2O_3$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and $0<x\leq1$, $0<y\leq0.1$, $(M<I>_{(1-x-y)} M<II>_x M<III>_y) S_{(1-z)}$ Se where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0<x\leq0.01$, $0<y\leq0.05$, $0\leq z<1$, $(M<I>_{(1-x-y)} M<II>_x M<III>_y)O$ where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0<x\leq0.1$, $0<y\leq0.1$, $(M<I>_{(2-x)} M<II>_x M<III>_2) O_7$ where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0<x\leq1$, $(M<I>_{(1-x)} M<II>_x M<III>_{(1-y)} M<IV>_y)O_3$ where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and M<IV> is selected from the group comprising Al, Ga, Sc, Si or mixtures thereof, and $0<x\leq0.1$, $0<y\leq0.1$, or mixtures thereof.

Other suitable luminescent materials are Ce doped Yttrium aluminum garnet (YAG, $Y_3Al_5O_{12}$) and Lutetium-Aluminum-Garnet (LuAG). A luminescent light guide may comprise a central emission wavelength within a blue color-range or within a green color-range or within a red color-range. The blue color-range is defined between 380 nanometer and 495 nanometer, the green color-range is defined between 495 nanometer and 590 nanometer, and the red color-range is defined between 590 nanometer and 800 nanometer.

A selection of phosphors which may be used in embodiments is given in table 1 below along with the maximum emission wavelength.

TABLE 1

| Phosphor | Maximum emission wavelength [nm] |
| --- | --- |
| $CaGa_2S_4$:Ce | 475 |
| $SrGa_2S_4$:Ce | 450 |
| $BaAl_2S_4$:Eu | 470 |
| $CaF_2$:Eu | 435 |
| $Bi_4Si_3O_{12}$:Ce | 470 |
| $Ca_3Sc_2Si_3O_{12}$:Ce | 490 |

The light guides as set forth below according to embodiments of the invention may comprise regions with a different density of suitable luminescent material for converting the light to another spectral distribution. In an embodiment a transparent light guide comprises two parts adjacent to each other and only one of which comprises a luminescent material and the other part is transparent or has a relatively low concentration of luminescent material. In another embodiment the light guide comprises yet another, third part, adjacent to the second part, which comprises a different luminescent material or a different concentration of the same luminescent material. The different parts may be integrally formed thus forming one piece or one light guide. In an embodiment a partially reflecting element may be arranged between the different parts of the light guide, for example between the first part and the second part. The partially reflecting element is adapted for transmitting light with one specific wavelength or spectral distribution and for reflecting light with another, different, specific wavelength or spectral distribution. The partially reflecting element may thus be a dichroic element such as a dichroic mirror.

In another embodiment (not shown) a plurality of wavelength converting regions of luminescent material is arranged at the light input surface of a transparent light guide above or on top of a plurality of light sources, such as LEDs. Thus the surface area of each of the plurality of wavelength converting regions correspond to the surface area of each of the plurality of light sources such that light from the light sources is coupled into the transparent light guide via the regions of luminescent material. The converted light is then coupled into the transparent part of the light guide and subsequently guided to the light exit surface of the light guide. The wavelength converting regions may be arranged on the light input surface or they may be formed in the light guide. The wavelength converting regions may form part of a homogeneous layer arranged on or in the light guide at the light input surface. Parts of the homogeneous layer extending between two neighboring wavelength converting regions may be transparent and may additionally or alternatively have the same refractive index as the wavelength converting regions. The different wavelength converting regions may comprise mutually different luminescent materials. The distance between the light sources and the luminescent regions may be below 2 mm, below 1 mm or below 0.5 mm.

In embodiments of the light emitting device according to the invention as set forth below a coupling structure or a coupling medium may be provided for efficiently coupling the light emitted by the light source into the light guide. The coupling structure may be a refractive structure having features, such as e.g. protrusions and recesses forming a wave shaped structure. The typical size of the features of the coupling structure is 5 µm to 500 µm. The shape of the features may be e.g. hemispherical (lenses), prismatic, sinusoidal or random (e.g. sand-blasted). By choosing the appropriate shape, the amount of light coupled into the light guide can be tuned. The refractive structures may be made by mechanical means such as by chiseling, sand blasting or the like. Alternatively, the refractive structures may be made by replication in an appropriate material, such as e.g. polymer or sol-gel material. Alternatively, the coupling structure may be a diffractive structure, where the typical size of the features of the diffractive coupling structure is 0.2 µm to 2 µm. The diffraction angles $\theta_{in}$ inside the light guide are given by the grating equation $\lambda/\Lambda = n_{in} \cdot \sin \theta_{in} - n_{out} \cdot \sin \theta_{out}$, where $\lambda$ is the wavelength of LED light, $\Lambda$ is the grating period, $n_{in}$ and $n_{out}$ are the refractive indices inside and outside the light guide, $\theta_{in}$ and $\theta_{out}$ are the diffraction angle inside and the incident angle outside the light guide, respectively. If we assume the same refractive index $n_{out}=1$ for low-index layer and coupling medium, we find, with the condition for total internal reflection $n_{in} \sin \theta_{in} = n_{out}$, the following condition: $\lambda/\Lambda = 1 - \sin \theta_{out}$, i.e. $\Lambda = \lambda$ for normal incidence $\theta_{out} = 0$. Generally, not all other angles $\theta_{out}$ are diffracted into the light guide. This will happen only if its refractive index $n_{in}$ is high enough. From the grating equation it follows that for the condition $n_{in} \geq 2$ all angles are diffracted if $\Lambda = \lambda$. Also other periods and refractive indices may be used, leading to less light that is diffracted into the light guide. Furthermore, in general a lot of light is transmitted ($0^{th}$ order). The amount of diffracted light depends on the shape and height of the grating structures. By choosing the appropriate parameters, the amount of light coupled into the light guide can be tuned. Such diffractive structures most easily are made by replication from structures that have been made by e.g. e-beam lithography or holography. The replication may be done by a method like soft nano-imprint lithography. The coupling medium may e.g. be air or another suitable material.

FIG. 1 shows a light emitting device 1001 comprising a light guide 4015 according to embodiments of the invention as set forth below. The light emitting device 1001 shown in FIG. 1 comprises a rotatable phosphor wheel 1600, and it further comprises a coupling element 7700 arranged between the light guide 4015 and the phosphor wheel 1600.

The light emitting device 1001 further comprises a light source in the form of a plurality of LEDs 2100, 2200, 2300 arranged on a base or substrate 1500. The plurality of LEDs 2100, 2200, 2300 are used to pump a conversion part 6110 of the light guide 4015 to produce light 1700 having a third spectral distribution, such as green or blue light. The phosphor wheel 1600, which is rotating in a rotation direction 1610 about an axis of rotation 1620, is used for converting the light 1700 having the third spectral distribution to light 1400 having a second spectral distribution, such as red and/or green light. It is noted that in principle any combination of colors of the light 1700 and the light 1400 is feasible.

As shown in FIG. 1, illustrating the phosphor wheel 1600 in a cross sectional side view, the phosphor wheel 1600 is used in the transparent mode, i.e. incident light 1700 enters the phosphor wheel 1600 at one side, is transmitted through the phosphor wheel 1600 and emitted from an opposite side thereof forming the light exit surface 4200. Alternatively, the phosphor wheel 1600 may be used in the reflective mode (not shown) such that light is emitted from the same surface as the surface through which it enters the phosphor wheel.

The phosphor wheel 1600 may comprise only one phosphor throughout. Alternatively, the phosphor wheel 1600 may also comprise segments without any phosphor such that also part of the light 1700 may be transmitted without being converted. In this way sequentially other colors can be generated. In another alternative, the phosphor wheel 1600 may also comprise multiple phosphor segments, e.g. segments of phosphors emitting yellow, green and red light, respectively, such as to create a multi-colored light output. In yet another alternative, the light emitting device 1001 may be adapted for generating white light by employing a pixelated phosphor-reflector pattern on the phosphor wheel 1600.

In an embodiment the coupling element 7700 is an optical element suitable for collimating the light 1700 incident on the phosphor wheel 1600, but it may also be a coupling medium or a coupling structure such as e.g. the coupling medium or the coupling structure 7700 described above. The light emitting device 1001 may furthermore comprise additional lenses and/or collimators. For example, additional optics may be positioned such as to collimate the light emitted by the light sources 2100, 2200, 2300 and/or the light 1400 emitted by the light emitting device 1001.

Figure 2:
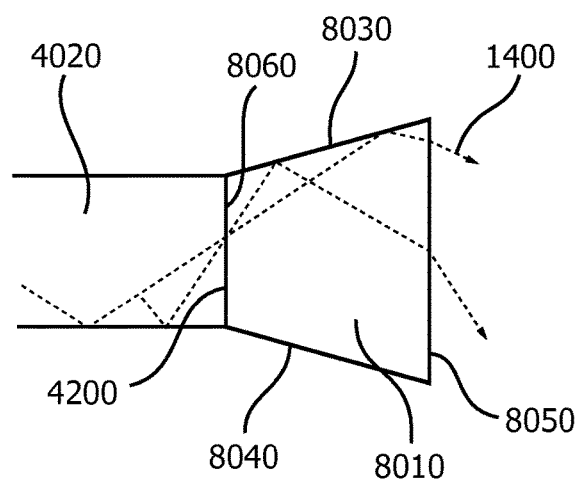
FIG. 2 shows side view of a light guide which is provided with an optical element at an exit surface.

FIG. 2 shows a light guide 4020 which comprises an optical element 8010 arranged with a light input facet 8060 in optical connection with a light exit surface 4200 of the light guide 4020. The optical element 8010 is made of a material having a high refractive index, in an embodiment a refractive index which is equal to or higher than that of the light guide 4020, and comprises a quadrangular cross section and two tapered sides 8030 and 8040. The tapered sides 8030 and 8040 are inclined outwardly from the light exit surface 4200 of the light guide 4020 such that the light exit facet 8050 of the optical element 8010 has a larger surface area than both the light input facet 8060 and the light exit surface 4200 of the light guide 4020. The optical element 8010 may alternatively have more than two, particularly four, tapered sides. In an alternative, the optical element 8010 has a circular cross section and one circumferential tapered side. With such an arrangement light will be reflected at the inclined sides 8030 and 8040 and has a large chance to escape if it hits the light exit facet 8050, as the light exit facet 8050 is large compared to the light input facet 8060. The shape of the sides 8030 and 8040 may also be curved and chosen such that all light escapes through the light exit facet 8050.

The optical element may also be integrally formed from the light guide 4020, for example by shaping a part of the light guide such that a predetermined optical element is formed at one of the ends of the light guide. The optical element may for example have the shape of a collimator, or may have a cross-sectional shape of a trapezoid and in an embodiment outside surfaces of the trapezoid shape are provided with reflective layers. Thereby the received light may be shaped such as to comprise a larger spot size while simultaneously minimizing the loss of light through other surfaces than the light exit surface, thus also improving the intensity of the emitted light. In another embodiment the optical element has the shape of a lens array, for example convex or concave lenses or combinations thereof. Thereby the received light may be shaped such as to form focused light, defocused light or a combination thereof. In case of an array of lenses it is furthermore feasible that the emitted light may comprise two or more separate beams each formed by one or more lenses of the array. In more general terms, the light guide may thus have differently shaped parts with different sizes. Thereby a light guide is provided with which light may be shaped in that any one or more of the direction of emission of light from the light exit surface, the beam size and beam shape of the light emitted from the light exit surface may be tuned in a particularly simple manner, e.g. by altering the size and/or shape of the light exit surface. Thus, a part of the light guide functions as an optical element.

The optical element may also be a light concentrating element (not shown) arranged at the light exit surface of the light guide. The light concentrating element comprises a quadrangular cross section and two outwardly curved sides such that the light exit surface of the light concentrating element has a larger surface area than the light exit surface of the light guide. The light concentrating element may alternatively have more than two, particularly four, tapered sides. The light concentrating element may be a compound parabolic light concentrating element (CPC) having parabolic curved sides. In an alternative, the light concentrating element has a circular cross section and one circumferential tapered side. If, in an alternative, the refractive index of the light concentrating element is chosen to be lower than that of the light guide (but higher than that of air), still an appreciable amount of light can be extracted. This allows for a light concentrating element which is easy and cheap to manufacture compared to one made of a material with a high refractive index. For example, if the light guide has a refractive index of n=1.8 and the light concentrating element has a refractive index of n=1.5 (glass), a gain of a factor of 2 in light output may be achieved. For a light concentrating element with a refractive index of n=1.8, the gain would be about 10% more. Actually, not all light will be extracted since there will be Fresnel reflections at the interface between the optical element or the light concentrating element and the external medium, generally being air. These Fresnel reflections may be reduced by using an appropriate anti-reflection coating, i.e. a quarter-lambda dielectric stack or moth-eye structure. In case the light output as function of position over the light exit facet is inhomogeneous, the coverage with anti-reflection coating might be varied, e.g. by varying the thickness of the coating.

One of the interesting features of a CPC is that the etendue (=$n^2$×area×solid angle, where n is the refractive index) of the light is conserved. The shape and size of the light input facet of the CPC can be adapted to those of the light exit surface of the light guide and/or vice versa. A large advantage of a CPC is that the incoming light distribution is transformed into a light distribution that fits optimally to the acceptable etendue of a given application. The shape of the light exit facet of the CPC may be e.g. rectangular or circular, depending on the desires. For example, for a digital projector there will be requirements to the size (height and width) of the beam, as well as for the divergence. The corresponding etendue will be conserved in a CPC. In this case it will be beneficial to use a CPC with rectangular light input and exit facets having the desired height/width ratio of the display panel used. For a spot light application, the requirements are less severe. The light exit facet of the CPC may be circular, but may also have another shape (e.g. rectangular) to illuminate a particularly shaped area or a desired pattern to project such pattern on screens, walls, buildings, infrastructures etc. Although CPCs offer a lot of flexibility in design, their length can be rather large. In general, it is possible to design shorter optical elements with the same performance. To this end, the surface shape and/or the exit surface may be adapted, e.g. to have a more curved exit surface such as to concentrate the light. One additional advantage is that the CPC can be used to overcome possible aspect ratio mismatches when the size of the light guide is restrained by the dimensions of the LED and the size of the light exit facet is determined by the subsequent optical components. Furthermore, it is possible to place a mirror (not shown) partially covering the light exit facet of the CPC, e.g. using a mirror which has a 'hole' near or in its center. In this way the exit plane of the CPC is narrowed down, part of the light is being reflected back into the CPC and the light guide, and thus the exit etendue of the light would be reduced. This would, naturally, decrease the amount of light that is extracted from the CPC and light guide. However, if this mirror has a high reflectivity, like e.g. Alanod 4200AG, the light can be effectively injected back into the CPC and light guide, where it may be recycled by TIR. This will not change the angular distribution of the light, but it will alter the position at which the light will hit the CPC exit plane after recycling thus increasing the luminous flux. In this way, part of the light, that normally would be sacrificed in order to reduce the system etendue, can be re-gained and used to increase for example the homogeneity. This is of major importance if the system is used in a digital projection application. By choosing the mirror in the different ways, the same set of CPC and light guide can be used to address systems using different panel sizes and aspect ratio's, without having to sacrifice a large amount of light. In this way, one single system can be used for various digital projection applications.

By using any one of the above structures described with reference to FIG. 2, problems in connection with extracting light from the high-index light guide material to a low-index material like air, particularly related to the efficiency of the extraction, are solved.

Figure 3:
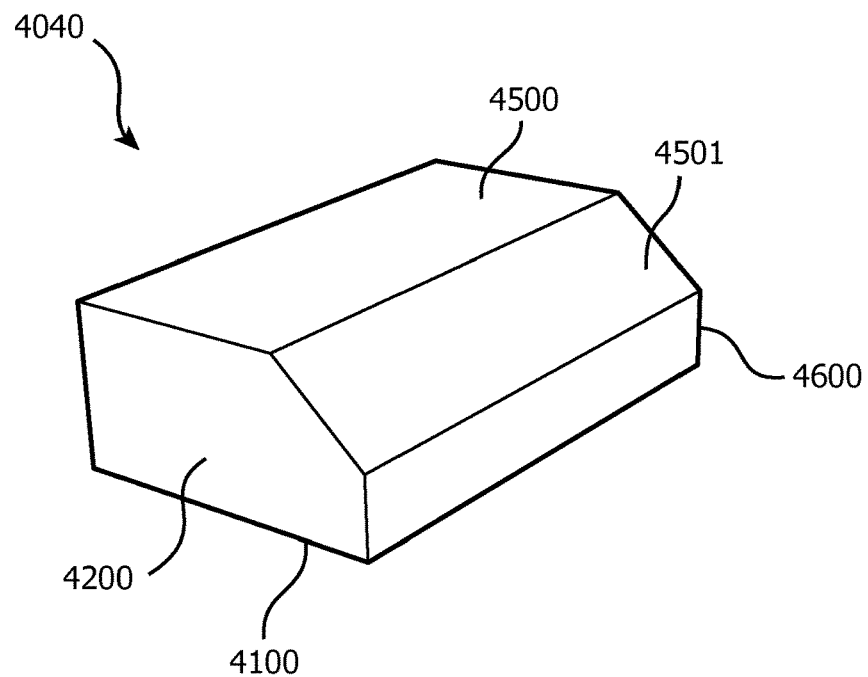
FIG. 3 shows a perspective view of a light guide which is shaped throughout its length such as to provide a shaped light exit surface.
Figure 4:
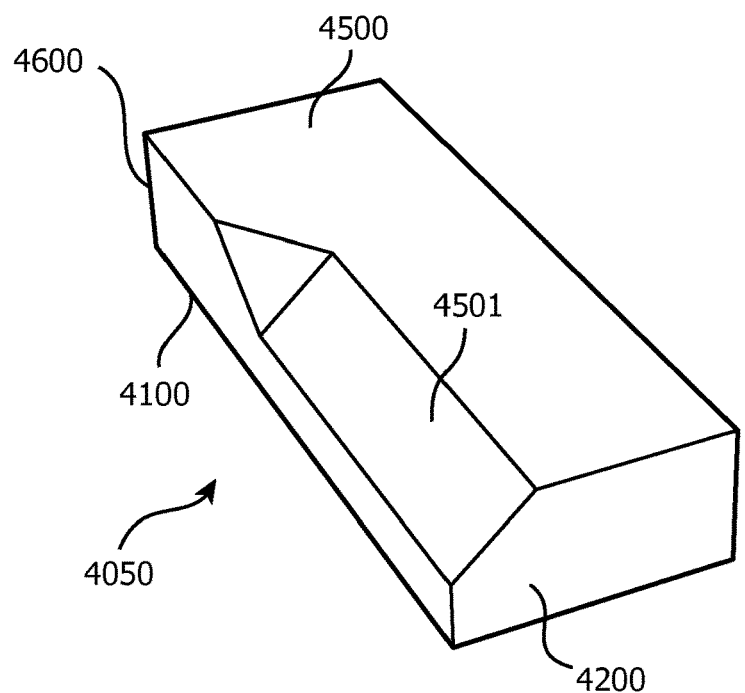
FIG. 4 shows a side view of a light guide which is shaped over a part of its length such as to provide a shaped light exit surface.

With reference to FIGS. 3 and 4 different possibilities for providing a light distribution having a particular shape will be described. FIG. 3 shows a perspective view of a light guide 4040 which is shaped throughout its length in order to provide a shaped light exit surface 4200. The light guide 4040 may be a transparent light guide or a light guide adapted for converting light with a first spectral distribution to light with a second spectral distribution. A part 4501 of the light guide 4040 extending throughout the length of the light guide 4040, particularly adjacent to the surface 4500 and opposite to the light input surface 4100, has been removed such as to provide the light guide 4040 with a shape corresponding to the desired shape of the light distribution at the light exit surface 4200, the shape extending throughout the entire length of the light guide 4040 from the light exit surface 4200 to the opposite surface 4600.

FIG. 4 shows a side view of a light guide 4050 which is shaped over a part of its length such as to provide a shaped light exit surface 4200. The light guide 4050 may be a transparent light guide or a light guide adapted for converting light with a first spectral distribution to light with a second spectral distribution. A part 4501 of the light guide 4050 extending over a part of the length of the light guide 4050 has been removed, particularly adjacent to the surface 4500 and opposite to the light input surface 4100, such as to provide the light guide 4050 with a shape corresponding to the desired shape of the light distribution at the light exit surface 4200, the shape extending over a part of the length of the light guide 4050 adjacent the light exit surface 4200.

Another part or more than one part of the light guide may be removed such as to provide for other shapes of the light exit surface. Any feasible shape of the light exit surface may be obtained in this way. Also, the light guide may be divided partly or fully into several parts having different shapes, such that more complex shapes may be obtained. The part or parts removed from the light guide may be removed by means of e.g. sawing, cutting or the like followed by polishing of the surface that is exposed after the removal of the part or parts. In another alternative a central part of the light guide may be removed, e.g. by drilling, such as to provide a hole in the light exit surface.

In an alternative embodiment, a light distribution having a particular shape may also be obtained by surface treating, e.g. roughening, a part of the light exit surface of the light guide, whilst leaving the remaining part of the light exit surface smooth. In this embodiment no parts of the light guide need to be removed. Likewise any combination of the above possibilities for obtaining a light distribution having a particular shape is feasible.

FIGS. 5A to 5D show side views of embodiments of a light guide 4010A, 4010B, 4010C and 4010D, respectively, as applied in embodiments of the light emitting device of the invention as set forth below, and comprising a light polarizing element 9001 arranged adjacent to the light exit surface 4200 of the respective light guide 4010A, 4010B, 4010C, 4010D as well as a as set forth below, the first and/or the second light guide according to the invention comprise a light polarizing element 9001 arranged adjacent to the light exit surface of the respective light guide 4010A, 4010B, 4010C, 4010D as well as a reflective element 7400 arranged at a surface 4600 of the respective light guide 4010A, 4010B, 4010C, 4010D extending opposite to the light exit surface 4200. Thereby a polarized light source having a high brightness and a high efficiency may be obtained. Irrespective of the embodiment the polarizing element 9001 may be any one of a reflective linear polarizer and a reflective circular polarizer. Wire grid polarizers, reflective polarizers based on stack of polymer layers comprising birefringent layers are examples of reflective linear polarizers. Circular polarizers can be obtained using polymers in the so-called cholesteric liquid crystal phase to make so-called cholesteric polarizers transmitting only light of one polarization and of a specific spectral distribution. Alternatively or in addition to the reflective polarizers, polarizing beam splitters can also be employed. Furthermore scattering polarizers can also be used. In another embodiment, polarization by reflection may be used, e.g. by means of a polarizing element in the form of a wedge made of a material like glass, in which light is incident close to the Brewster angle. In yet another embodiment, the polarizing element 9001 may be a so-called polarized backlight such as described in WO 2007/036877 A2. In yet another embodiment, the polarizing element 9001 may be a polarizing structure.

Figure 5A:
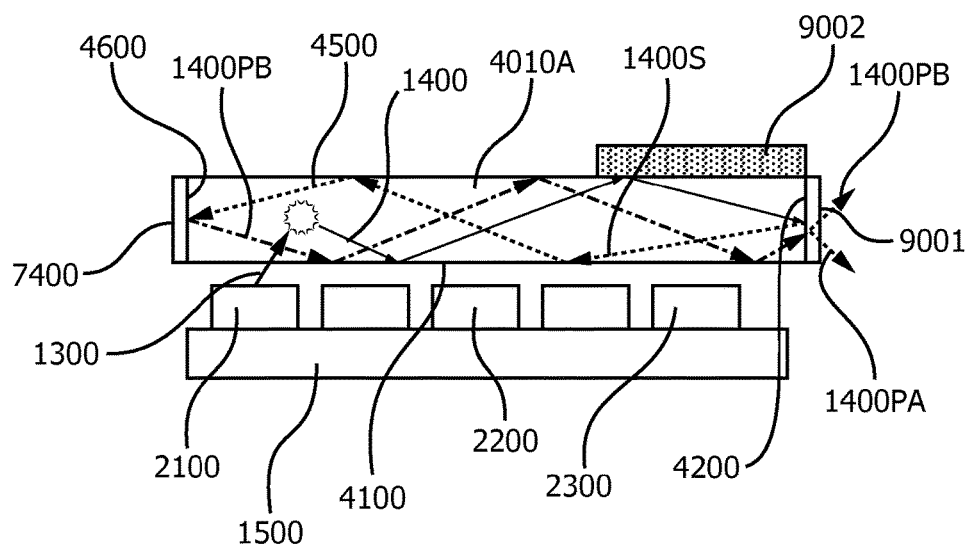
FIGS. 5A to 5D show light guides provided with a polarizing element arranged adjacent to the light exit surface of the light guide.

FIG. 5A shows an embodiment in which the polarizing element 9001 is arranged on the light exit surface 4200 of the light guide 4010A. The light sources 2100, 2200, 2300 emit first light 1300 having a first spectral distribution, which is converted in the light guide 4010A into second light 1400 having a second spectral distribution. Due to the polarizing element 9001 only light of a first polarization, in this case p-polarized light 1400PA, is transmitted and emitted from the light exit surface 4200 and light of a second polarization, in this case s-polarized light 1400S, is reflected back into the light guide 4010A. The reflected s-polarized light 1400S is reflected by the reflective element 7400. When reflected, at least a part of the reflected s-polarized light 1400S is altered into p-polarized light 1400PB which is transmitted by the polarizing element 9001. Thus, a light output comprising only light with a first polarization, in this case p-polarized light 1400PA, 1400PB is obtained.

Furthermore, in this example the light guide 4010A comprises a ¼ lambda plate 9002 arranged at one of the surfaces extending between the light exit surface 4200 and the opposite surface 4600, in the embodiment shown partially covering the surface 4500. Alternatively, the ¼ lambda plate may cover the surface 4500 completely or it may comprise two or more separate segments. Alternatively or in addition thereto, further ¼ lambda plates may be arranged at one or more other of the surfaces extending between the light exit surface 4200 and the surface 4600. In yet another embodiment the ¼ lambda plate 9002 may be arranged between the light guide and the reflective element 7400 such that a gap is provided between the ¼ lambda plate and the light guide. The ¼ lambda plate 9002 may be used for converting light with a first polarization into light with a second polarization, particularly for converting circularly polarized light into linearly polarized light. It is noted, however, that irrespective of the embodiment the ¼ lambda plate 9002 is an optional element, and that it thus may also be omitted.

Figure 5B:
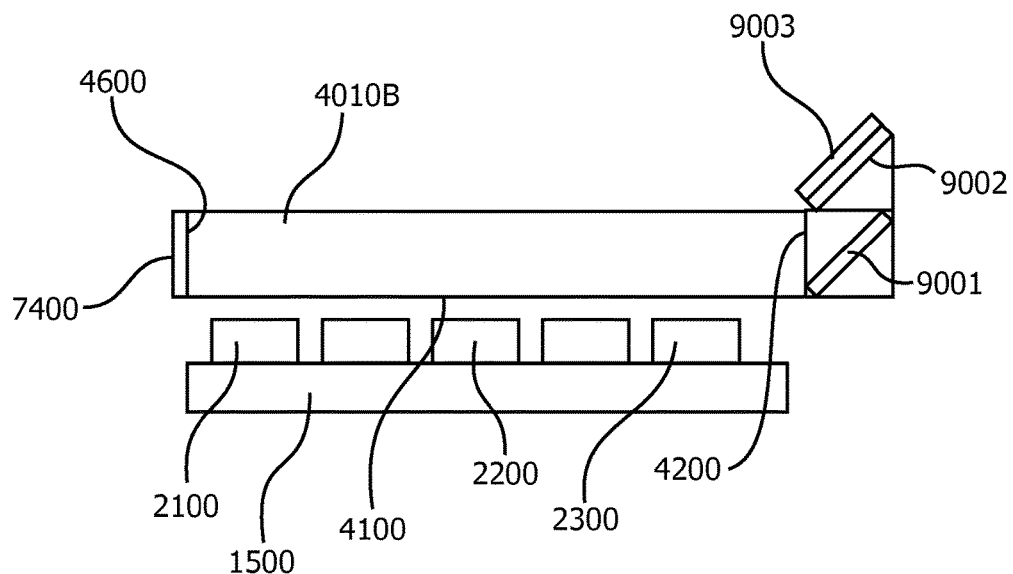

FIG. 5B shows an embodiment in which the polarizing element 9001 is arranged angled with respect to the light exit surface 4200, as shown in an angle of 45° relative to the light exit surface 4200 although any angle is in principle feasible. Furthermore, a ¼ lambda plate 9002 and a reflective element 9003 stacked on top of each other are arranged in the beam path downstream of the polarizing element 9001 such that they extend substantially in parallel with the polarizing element 9001. Thereby, reflected light with a first polarization is coupled out of the light guide 4010B and is thereupon altered into light with a second polarization by the polarizing element 9001, Subsequently the light with the second polarization is redirected by the reflective element 9003 and further polarized by the ¼ lambda plate 9002.

Figure 5C:
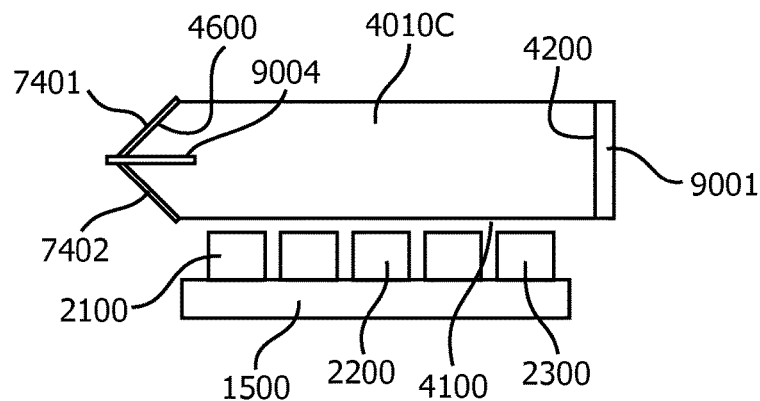

FIG. 5C shows an embodiment very similar to that shown in FIG. 5A but according to which the light guide 4010C as an alternative comprises a tapered surface 4600 opposite to the light exit surface 4200. The tapered surface 4600 is provided with reflective elements 4701, 4702 separated by an insert in the form of a ½ lambda plate 9004.

Figure 5D:
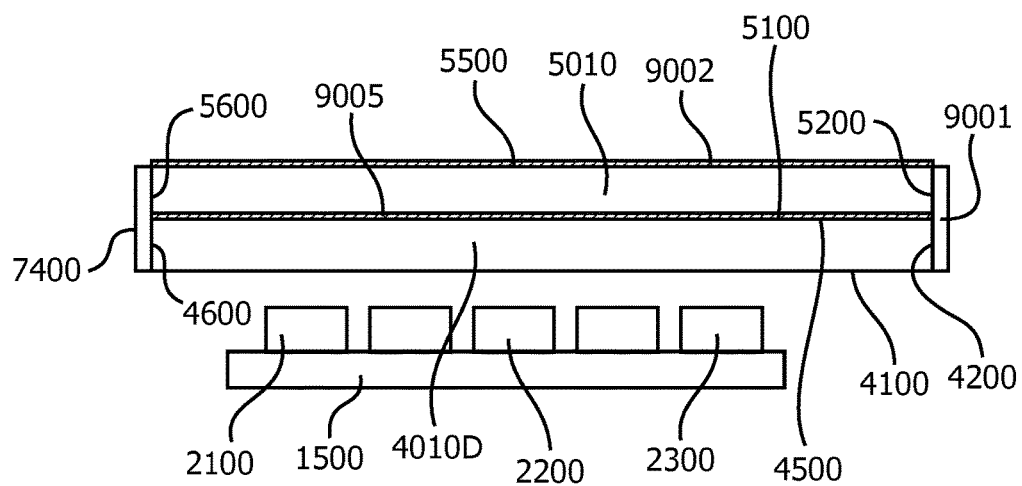

FIG. 5D shows an embodiment in which two light guides 4010D and 5010 are stacked such that the surface 4500 of the light guide 4010D and the light input surface 5100 of the light guide 5010 face each other and with a further polarizing element 9005 arranged in between and in optical contact with the light guides 4010D and 5010. A polarizing element 9001 is arranged on the light exit surfaces 4200 and 5200 of the light guides 4010D and 5010 and a reflective element 7400 is arranged on the surfaces 4600 and 5600 of the light guides 4010D and 5010 opposite the respective light exit surfaces 4200, 5200. The further polarizing element 9005 transmits light with a polarization being perpendicular to the polarization of the light transmitted by the polarizing element 9001. A ¼ lambda plate 9002 may be applied to at least a part of the surface 5500 of the light guide 5010.

In further alternative embodiments the polarizing element 9001 may be provided as a part of an optical element arranged at the light exit surface 4200 of the light guide. In one particular embodiment the polarizing element 9001 is then arranged such as to be located opposite to the light exit surface 4200 in the mounted position of the optical element. By way of example such an optical element may for instance be an optical element, a compound parabolic light concentrating element (CPC) or an optical element as described above. Alternatively, such an optical element may be a light mixing chamber. Particularly in case of a CPC a ¼ lambda plate may be arranged in the CPC opposite to the polarizing element 9001.

Figure 6:
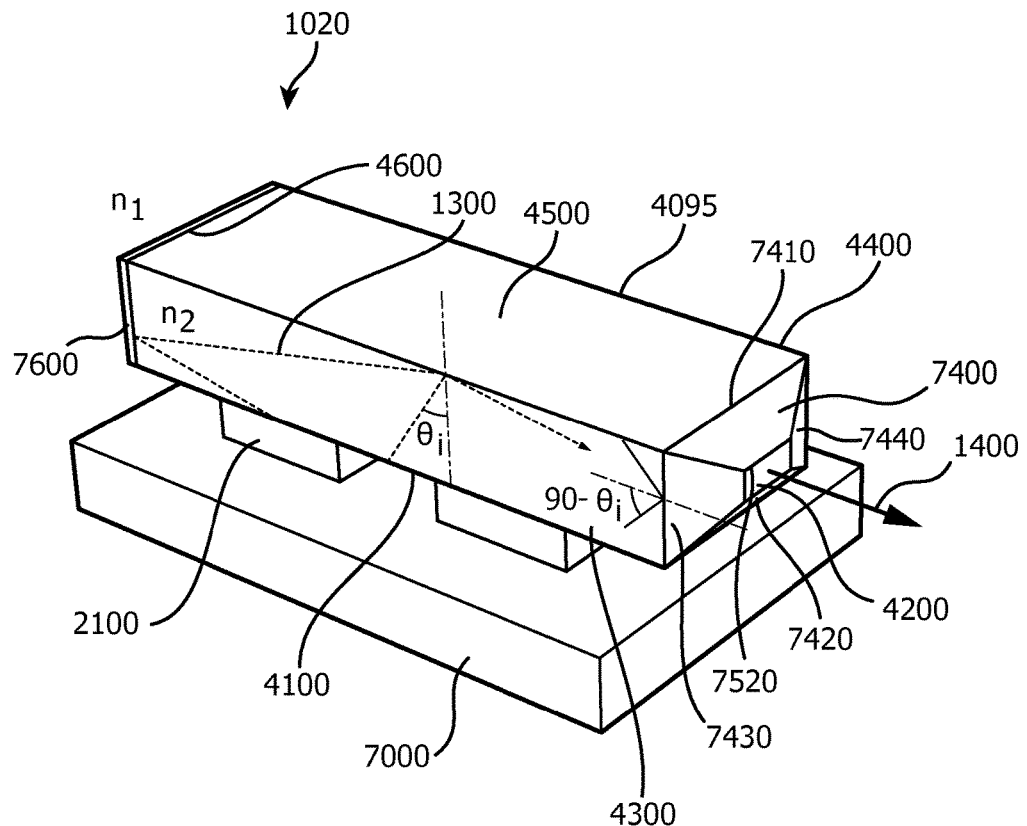
FIG. 6 shows a perspective view of a light emitting device having a tapered exit surface.

FIG. 6 shows a light emitting device 1020 comprising a light source 2100 comprising a plurality of LEDs and a light guide 4095, which is an embodiment of the light guides according to the invention as set forth below. The light source 2100 is in this example arranged on a base or substrate in the form of a heat sink 7000, in embodiments made of a metal such as copper, iron or aluminum. It is noted that in other embodiments the base or substrate need not be a heat sink. The light guide 4095 is shown shaped generally as a bar or rod having a light input surface 4100 and a light exit surface 4200 extending in an angle different from zero, in this particular case perpendicular, with respect to one another such that the light exit surface 4200 is an end surface of the light guide 4095. The light input surface 4100 and the light exit surface 4200 may have different sizes, in embodiments such that the light input surface 4100 is larger than the light exit surface 4200. The light guide 4095 further comprises a further surface 4600 extending parallel to and opposite the light exit surface 4200, the further surface 4600 thus likewise being an end surface of the light guide 4095. The light guide 4095 further comprises side surfaces 4300, 4400, 4500. The light guide 4095 may also be plate shaped, e.g. as a square or rectangular plate.

The light emitting device 1020 further comprises a first mirror element 7600 arranged at the further surface 4600 of the light guide 4095 as well as a second mirror element 7400 arranged at the light exit surface 4200 of the light guide 4095. As shown the first mirror element 7600 is arranged in optical contact with the light exit surface 4200 and the second mirror element 7600 is arranged in optical contact with the further surface 4600. Alternatively, a gap may be provided between one or both of the first and the second mirror element 7600 and 7400 and the further surface 4600 and the light exit surface 4200, respectively. Such a gap may be filled with e.g. air or an optical adhesive.

The light exit surface 4200 of the light guide 4095 is further provided with four inwardly tapered walls and a central flat part extending parallel with the further surface 4600. By "tapered wall" as used herein is meant a wall segment of the light exit surface 4200 which is arranged in an angle different from zero degrees to both the remaining part(s) of the light exit surface and to the surfaces of the light guide extending adjacent to the light exit surface. The walls are tapered inwardly, meaning that the cross-section of the light guide is gradually decreasing towards the exit surface. In this embodiment a second mirror element 7400 is arranged at, and is in optical contact with, the tapered walls of the light exit surface 4200. Hence, the second mirror element is provided with four segments 7410, 7420, 7430 and 7410 corresponding to and covering each of the tapered walls of the light exit surface 4200. A through opening 7520 corresponding to the central flat part of the light exit surface 4200 defines a transparent part of the light exit surface 4200 through which light may exit to be emitted from the light emitting device 1020.

In this way a light emitting device is provided in which the light rays that hit the second mirror element change angular direction such that more light rays are directed towards the light exit surface 4200 and light rays that previously would remain within the light guide 4095 due to TIR due to the change in angular directions now hit the light exit surface 4200 with angles smaller than the critical angle of reflection and consequently may leave the light guide through the through opening 7520 of the light exit surface 4200. Thereby the intensity of the light emitted by the light emitting device through the light exit surface 4200 of the light guide 4095 is increased further. Particularly, when the light guide is a rectangular bar, there will be light rays that hit the second mirror element at the exit surface perpendicularly, and as such cannot leave the bar since they remain bouncing between the two mirror elements. When one mirror element is tilted inwards, the light rays change direction after being reflected at that mirror element and may leave the light guide via the transparent part of the second mirror element. Thus, this configuration provides for improved guidance of light towards the central flat part of the light exit surface 4200 and thus the through hole 7520 in the second mirror element 7400 by means of reflection off of the tapered walls.

In alternative embodiments other numbers of tapered walls, such as less or more than four, e.g. one, two, three, five or six tapered walls, may be provided, and similarly not all tapered walls need be provided with a second mirror element or segments thereof. In other alternatives, one or more of the tapered walls may be uncovered by the second mirror element 7400, and/or the central flat part may be covered partly or fully by the second mirror element 7400.

Figure 7:
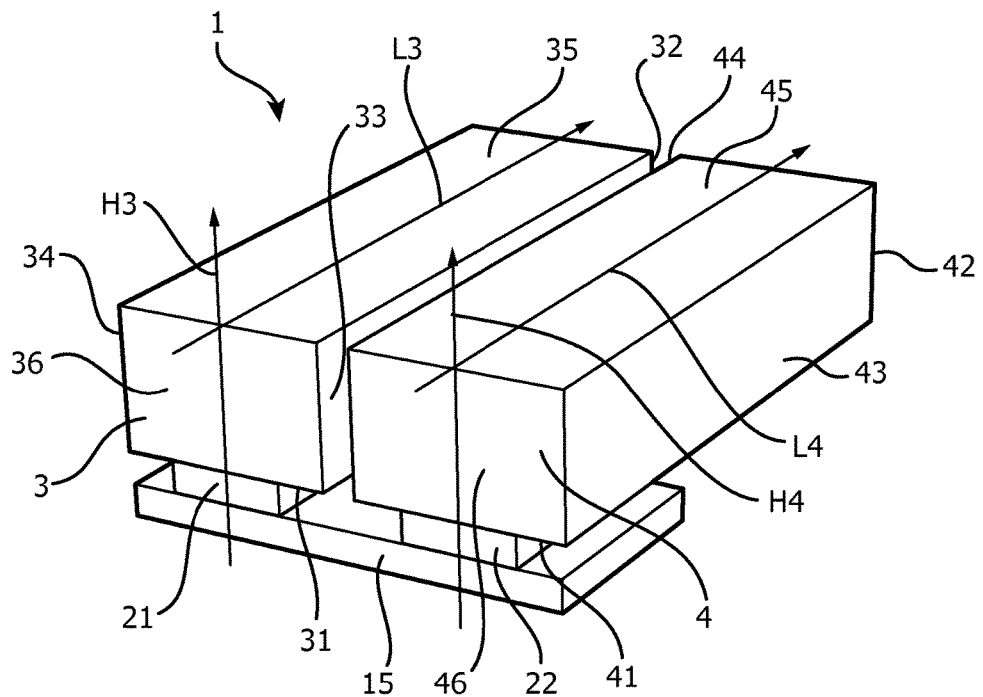
FIG. 7 shows a perspective view of a first embodiment of a light emitting device according to the invention.

FIG. 7 shows a perspective view of a light emitting device 1 according to a first and general embodiment of the invention. The light emitting device 1 generally comprises a first light source 21 comprising at least one solid state light source such as a LED or laser diode, a second light source 22 comprising at least one solid state light source such as a LED or a laser diode, a first light guide 3 and a second light guide 4. Suitable types of LEDs or laser diodes are described above.

Preferably, multiple LEDs are used. For simplicity FIGS. 7-12 all show configurations in which only a few LEDs are used and in which the LEDs cover only a relatively small area of the light input surface of the light guide(s). In practice, however, a plurality of LEDs are used and often (almost) the complete area of the light input surface of the light guide is used for incoupling LED light into the light guide. By using multiple light sources to pump the light guide a high brightness light source may be obtained.

Preferably, at least 2 or more LEDs is provided per light guide, more preferably more than 5 LEDs per light guide, most preferably more than 9 LEDs per light guide.

The first and second light source 21 and 22 are arranged on a base or substrate 15. The base or substrate 15 may be provided in the form of a heat sink, preferably made of a metal such as copper, iron or aluminum. The heat sink may comprise fins (not shown) for improved heat dissipation. It is noted that in other embodiments the base or substrate need not be a heat sink. Also, as the base or substrate is not essential it may in yet other embodiments even be omitted.

The first light guide 3 is shown shaped generally as a bar or rod having a first light input surface 31, extending along the longitudinal direction of the light guide, and a first light exit surface 32 extending at an angle different from zero with respect to each other such that the first light exit surface 32 is an end surface of the first light guide 3, arranged at an end of the longitudinal direction of the bar or rod shaped light guide. The first light guide 3 further comprises a surface 36 extending parallel to and opposite the first light exit surface 32, the surface 36 thus likewise being an end surface of the first light guide 3. The first light guide 3 further comprises side surfaces 33, 34, 35. The first light guide 3 may also be plate shaped, e.g. as a square or rectangular plate. The first light source 21 is arranged adjacent to and in optical contact with the first light input surface 31 of the first light guide 3.

Furthermore, the first light guide 3 may comprise a transparent material, a luminescent material, a garnet, a light concentrating material or a combination thereof, suitable materials and garnets being described above.

In this example the first light guide 3 is a transparent light guide comprising a material adapted for converting light with one spectral distribution to light with another spectral distribution, for example partially overlapping or substantially non-overlapping, spectral distributions. The material adapted for converting light with one spectral distribution to light with another spectral distribution may be arranged at a surface of the first light guide 3 or it may be embedded in the first light guide 3.

The second light guide 4 is shown shaped generally as a bar or rod having a second light input surface 41, extending along the longitudinal direction of the light guide, and a second light exit surface 42 extending at an angle different from zero with respect to each other such that the second light exit surface 42 is an end surface of the second light guide 4, arranged at an end of the longitudinal direction of the bar or rod shaped light guide. The second light guide 4 further comprises a surface 46 extending parallel to and opposite the second light exit surface 42, the surface 46 thus likewise being an end surface of the second light guide 4. The second light guide 4 further comprises side surfaces 43, 44, 45. The second light guide 4 may also be plate shaped, e.g. as a square or rectangular plate. The second light source 22 is arranged adjacent to and in optical contact with the second light input surface 42 of the second light guide 4.

Furthermore, the second light guide 4 comprises a transparent material, a luminescent material, a garnet, a light concentrating material or a combination thereof, suitable materials and garnets being described above.

In this example the second light guide 4 is a transparent light guide comprising a material adapted for converting light with one spectral distribution to light with another spectral distribution, for example partially overlapping or substantially non-overlapping, spectral distributions. The material adapted for converting light with one spectral distribution to light with another spectral distribution may be arranged at a surface of the second light guide 4 or it may be embedded in the second light guide 4.

The first light guide 3 and the second light guide 4 are arranged extending parallel to one another in such a way that the first light input surface 31 and the second light input surface 41 are arranged side by side and facing in the same direction. Thus, the first light source 21 and the second light source 22 are arranged on a common substrate 15 and are placed on the same side of the first and second light guides 3 and 4. This contributes to a suitable mixing of the light emitted by and exiting from the first and the light emitted by exiting from the second light guide, such as to provide for for example white light.

As illustrated in FIG. 7, the first light guide 3 comprises a longitudinal extension or length direction L3 extending between and perpendicular to the first light exit surface 32 and the surface 36, which surface 36 extends parallel to and is opposite to the first light exit surface 32. Likewise, the second light guide 4 comprises a longitudinal extension or length direction L4 extending between and perpendicular to the second light exit surface 42 and the surface 46, which surface 46 extends parallel to and is opposite to the second light exit surface 42. The length of the first light guide 3, being the shortest distance between the first light exit surface 32 and the surface 36, and the second light guide 4, being the shortest distance between the second light exit surface 42 and the surface 46, may be the same. Alternatively, the longitudinal extension or length of the first light guide 3 may be smaller than the longitudinal extension or length of the second light guide 4 or vice versa.

As illustrated in FIG. 7, the first light guide 3 furthermore comprises a height extension or height direction H3 extending perpendicular to the length direction L3 and between the first light input surface 31 and the surface 35, which surface 35 extends parallel to and is opposite to the first light input surface 31. Likewise, the second light guide 4 comprises a height extension or height direction H4 extending perpendicular to the length direction L4 and between the second light input surface 41 and the surface 45, which surface 45 extends parallel to and is opposite to the second light input surface 41. The height of the first light guide 3, being the shortest distance between the first light input surface 31 and the surface 35, and the second light guide 4, being the shortest distance between the second light input surface 41 and the surface 45, respectively, is preferably considerably smaller than the length extension or length of the first light guide 3 and the second light guide 4, respectively, such that the first light guide 3 and the second light guide 4 have a relatively flat shape.

Figure 8:
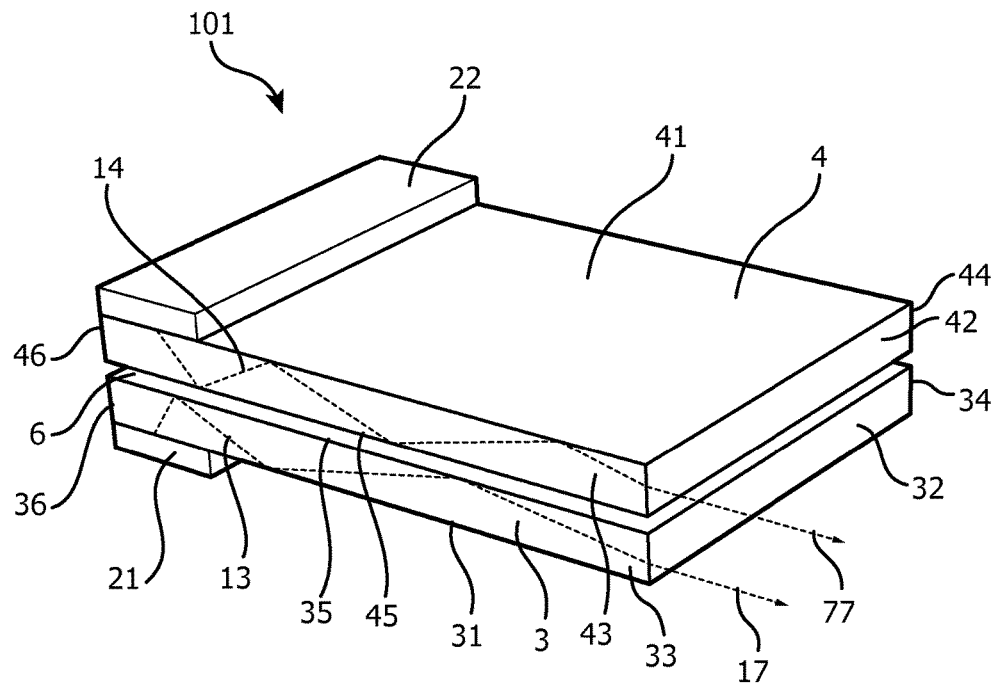
FIG. 8 shows a perspective view of a second embodiment of a light emitting device according to the invention.

Turning now to FIG. 8, a second embodiment of a light emitting device 101 according to the invention is shown in a perspective view.

The light emitting device 101 differs from the one shown in FIG. 7 in that the first light guide 3 and the second light guide 4 are arranged extending parallel to one another in such a way that the first light input surface 31 and the second light input surface 41 are arranged facing in opposite directions.

The first light guide 3 and the second light guide 4 are furthermore separated by a gap 6 which extends between the surfaces 35 and 45, and parallel to the first and second light input surface 31 and 41 and which is opposite to the first and second light input surface 31 and 41. The gap 6 may be filled e.g. with air or an optical adhesive. Alternatively, the first and second light guide 3 and 4 may be arranged in direct physical contact with each other, i.e. the gap 6 may be omitted.

As an alternative to or in addition to the gap 6, a shielding member may be placed between the first light guide 3 and the second light guide 4 to shield the light emitted by the first light source and/or the light converted by the first light guide 3 from the light emitted by the second light source 22 and/or the light converted by the second light guide 4. The shielding member may cover only a part of the area of the adjacent surfaces 35 and 45, but preferably covers the whole area of the adjacent surfaces 35 and 45.

With reference to FIG. 8, a light emitting device according to the invention generally works as follows. Light 13 having a first spectral distribution is emitted by the first light source 21. The light 13 having the first spectral distribution is then coupled into the first light guide 3 at the first light input surface 31. At least a part of the light 13 with the first spectral distribution is converted by the light guide 3 to light 17 having a third spectral distribution. Finally, the light 17 having the third spectral distribution is coupled out of the first light guide 3 at the first light exit surface 32, and is thus emitted by the light emitting device 1. Simultaneously, light 14 having a second spectral distribution is emitted by the second light source 22. The light 14 having the second spectral distribution is then coupled into the second light guide 4 at the second light input surface 41. At least a part of the light 14 with the second spectral distribution is converted by the second light guide 4 to light 77 having a fourth spectral distribution. Finally, the light 77 having a fourth spectral distribution is coupled out of the second light guide 4 at the second light exit surface 42, and is thus emitted by the light emitting device 1.

Preferably and irrespective of the embodiment, the first spectral distribution and the second spectral distribution are both comprised in the range from 200 nm to 500 nm, and the third spectral distribution and the fourth spectral distribution are both comprised in the range from 400 nm to 800 nm. Thereby a light emitting device is provided which is particularly suitable for providing a white light output of a high quality and intensity, for example by mixing the output light, i.e. the light emitted by and exiting from the first light guide and the light emitted by and exiting from the second light guide, for example with a suitable optical element which is arranged adjacent to the first and second light exit surface.

Irrespective of the embodiment the light 13 having the first spectral distribution and the light 14 having the second spectral distribution may have identical or substantially fully overlapping spectral distributions. Alternatively and still irrespective of the embodiment, the light 13 having the first spectral distribution and the light 14 having the second spectral distribution may have different, e.g. partially overlapping or substantially non-overlapping, spectral distributions. The light 17 having the third spectral distribution and the light 77 having the fourth spectral distribution have different, e.g. partially overlapping or substantially non-overlapping, spectral distributions.

It is furthermore noted that in all embodiments light is guided within the first and second light guides 3 and 4 by means of Total Internal Reflection (TIR). To obtain optimum conditions for TIR, the first and second light guides 3 and 4 are preferably provided with smooth surfaces. The surface roughness of the first and second light guides 3 and 4 is below 500 nm, below 100 nm or even below 50 nm.

Figure 9:
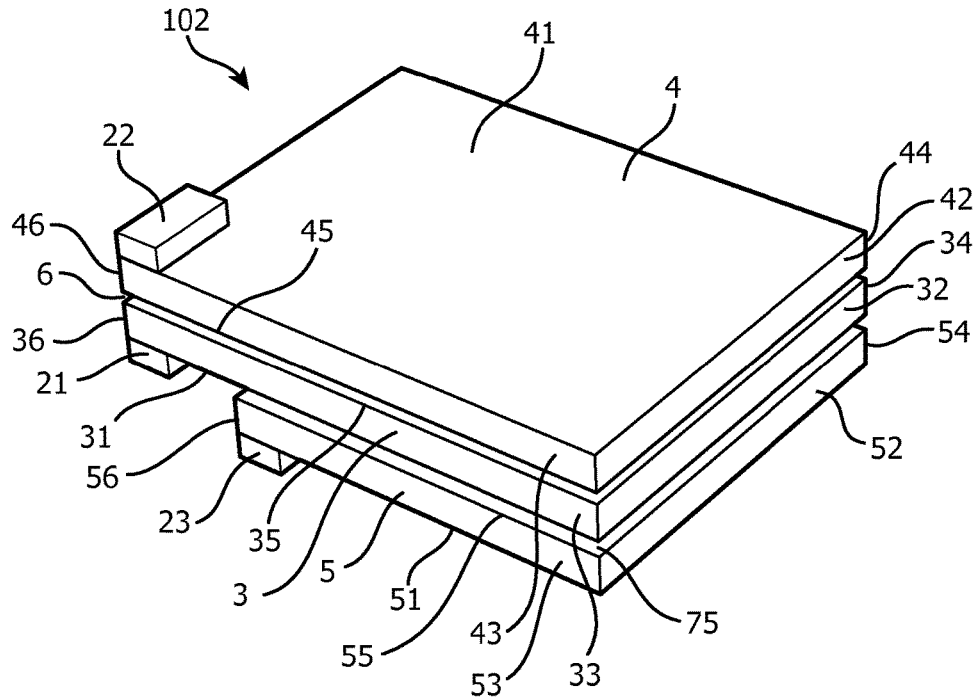
FIG. 9 shows a perspective view of a third embodiment of a light emitting device according to the invention.

Turning now to FIG. 9, a third embodiment of a light emitting device 102 according to the invention is shown in a perspective view.

In this embodiment the light emitting device 102 comprises a further light guide 5 and a further light source 23, and the first, second and further light guides 3, 4 and 5 are luminescent light guides.

The further light guide 5 is shown shaped generally as a bar or rod having a further light input surface 51, extending along the longitudinal direction of the further light guide, and a further light exit surface 52 extending at an angle different from zero with respect to each other such that the further light exit surface 52 is an end surface of the further light guide 5, arranged at an end of the longitudinal direction of the bar or rod shaped further light guide. The further light guide 5 further comprises a surface 56 extending parallel to and opposite the further light exit surface 52, the surface 56 thus likewise being an end surface of the further light guide 5. The further light guide 5 further comprises side surfaces 53, 54, 55. The further light guide 5 may also be plate shaped, e.g. as a square or rectangular plate.

Furthermore, the further light guide 5 may comprise a transparent material, a luminescent material, a garnet, a light concentrating material or a combination thereof, suitable materials and garnets being described above.

The further light source 23 is arranged adjacent to and in optical contact with the further light input surface 51 of the further light guide 5.

The further light source emits light with a fifth spectral distribution, which may be the same as or different from the first spectral distribution and from the second spectral distribution, for example having partially overlapping or substantially non-overlapping, spectral distribution with respect to the first and second spectral distributions. The further light guide 5 is adapted to convert at least a part of the light having the fifth spectral distribution received from the further light source to light with a sixth spectral distribution. The sixth spectral distribution is different from the third spectral distribution and from the fourth spectral distribution, for example having partially overlapping or substantially non-overlapping, spectral distribution with respect to the third and fourth spectral distributions. This provides for a light emitting device with a further improved mixing of light resulting in, for example, a white light source created by three light guides, with a relatively high intensity.

As shown in FIG. 9, the further light guide 5 is arranged such that the surface 55 extending parallel and opposite to the further light input surface 51 is arranged extending adjacent to the first light input surface 31 of the first light guide 3. The further light guide 5 and the first light guide 3 are separated by a gap 75, which may be filled with e.g. air or an optical adhesive. Alternatively, the further and first light guide 5 and 3 may be arranged in direct physical contact with each other, i.e. the gap 75 may be omitted.

Furthermore, the further light guide 5 comprises a length defined as the shortest distance between the further light exit surface 52 and the surface 56 which length is smaller than that of the first and second light guides 3 and 4.

Obviously, numerous other configurations with respect to the order in which the first, second and further light guides 3, 4 and 5 are arranged, their mutual and respective orientations and/or their respective dimensions are feasible. For instance all three light guides may have different lengths.

Figure 10:
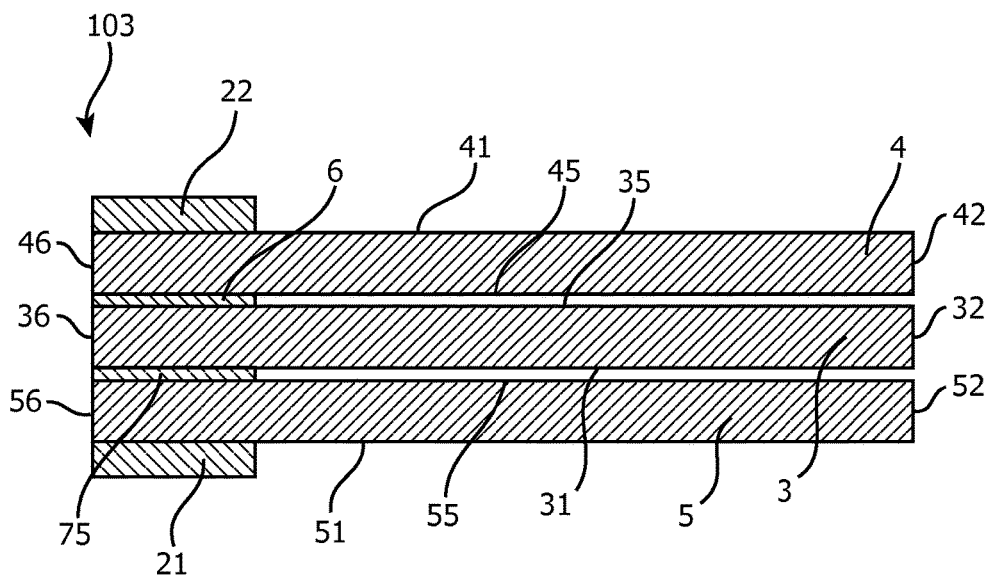
FIG. 10 shows a side view of a fourth embodiment of a light emitting device according to the invention.

An example is shown in FIG. 10 featuring a fourth embodiment of a light emitting device 103 according to the invention is shown in a side view. In this embodiment the first, second and third light guides 3, 4 and 5 have the same length.

Furthermore, the further light source 23 has been omitted, the first and second light sources 21, and 22 providing all of the first, second and further light guides 3, 4 and 5 with light. To enable light source light to reach the first light guide 3, which is placed in between the second and further light guides 4 and 5, the gaps 6 and 75 are filled with a suitable material, such as an optical adhesive, allowing light to pass with a minimum of loss. The material in the gaps 6 and 75 may fill the gap completely or partly.

Figure 11:
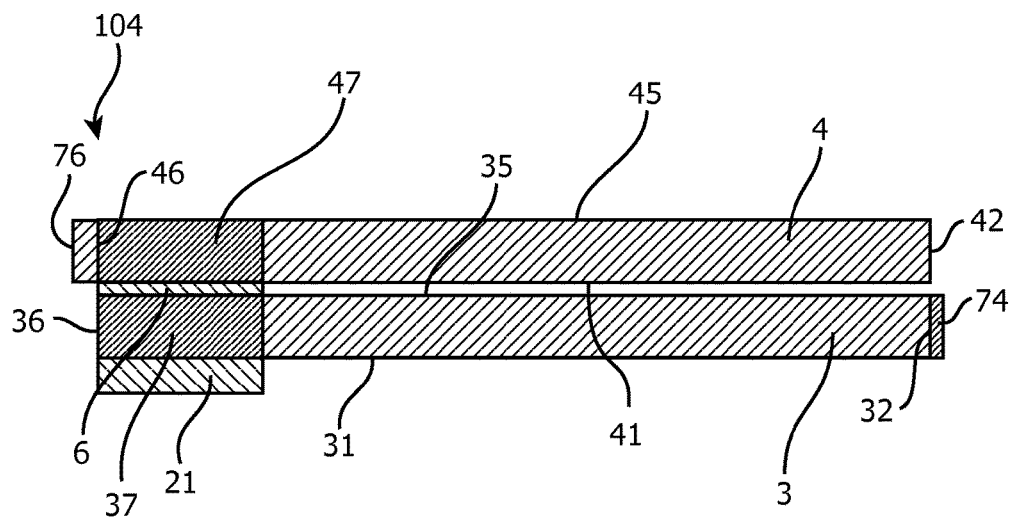
FIG. 11 shows a side view of a fifth embodiment of a light emitting device according to the invention.

Turning now to FIG. 11, a fifth embodiment of a light emitting device 104 according to the invention is shown in a side view.

The light emitting device 104 comprises only one light source 21 providing both the first and second light guides 3 and 4 with light. To enable light source light to reach the second light guide 4, which is placed on the opposite side of the first light guide 3 with respect to the light source 21, the gap 6 is filled with a suitable material such as an optical adhesive allowing light to pass with a minimum of loss.

Furthermore, the first and second light guides 3 and 4 are both transparent light guides. The first light guide 3 is provided with a section 37 made of or comprising a luminescent material and the second light guide 4 is provided with a section 47 made of or comprising a luminescent material. Suitable luminescent materials are described above. The luminescent sections 37 and 47 are provided near the surfaces 36 and 46, respectively, of the first and second light guides 3 and 4.

Furthermore the first light guide 3 is provided with a reflective mirror element 74 arranged adjacent to or on the light exit surface 32, while the second light guide 4 is provided with a reflective mirror element 76 arranged adjacent to or on the surface 46. The mirror elements 74 and 76 may be e.g. a mirror plate, a mirror coating or a mirror foil. The mirror element 74 may furthermore comprise a through opening which defines the part of the light exit surface 42 through which light may escape to be emitted from the light emitting device 1. Thereby, the light intensity of the light leaving the light guide at the light exit surface via the transparent part in the second mirror element may be increased further. Also, in alternative embodiments, it is feasible that one or both of the first and second light guides 3 and 4 be provided with a reflective mirror element both at its light exit surface and at its surface extending parallel to and opposite the light exit surface. The provision of such mirror elements provides for lowering of the light losses and thus a higher output intensity of the light emitting device.

Figure 12:
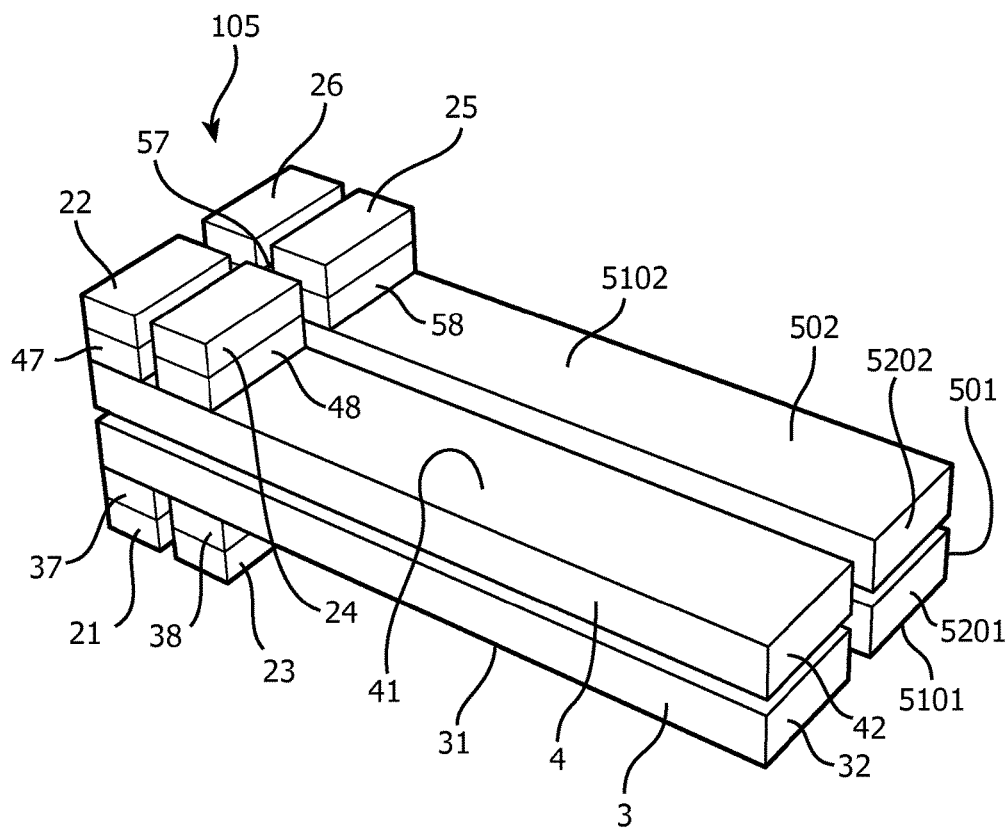
FIG. 12 shows a perspective view of a sixth embodiment of a light emitting device according to the invention.

Turning now to FIG. 12, a sixth embodiment of a light emitting device 105 according to the invention is shown in a perspective view.

In this embodiment the light emitting device 105 comprises two further light guides, a third light guide 501 and a fourth light guide 502, and thus a total of four light guides arranged parallel to each other in a longitudinal direction. The first and second light guide 3 and 4 as well as the third and fourth light guides 501 and 502 are transparent light guides.

The light emitting device 105 further comprises a total of eight light sources of which two are not visible in the figure while the remaining six light sources 21-26 are visible. Each of the four light guides is associated with two light sources. The first light guide 3 is associated with light sources 21 and 23 and the second light guide 4 is associated with light sources 22 and 24. The third and the fourth light guides 501 and 502 each comprise a further light input surface 5101 and 5102, respectively, and a further light exit surface 5201 and 5202, respectively. The fourth guide 502 is associated with two light sources 25 and 26. The third guide 501 is associated with two light sources that are not visible in FIG. 12.

Furthermore each light guide 3, 4, 501, 502 comprises two luminescent elements 37, 38, 47, 48, 57, 58 arranged between the respective light guide and light sources, and thus on a surface, namely the light input surface 31, 41, 5101, 5102 of the respective light guide. The third guide 501 likewise comprises two luminescent elements which are not visible in FIG. 12 and which are arranged on the light input surface 5101 of the third guide 501.

Obviously, alternative embodiments in which a different, higher or lower, number of further light guides, light sources and/or luminescent elements are provided are also feasible. Likewise each light guide present need not necessarily comprise the same number of luminescent elements and/or assigned light sources. Also, other geometrical configurations of the individual light guides, and/or of the arrangement of the light guides with respect to each other are feasible.

As an example, the light guides may be provided with one flat surface where the LEDs are arranged to couple light into the light guide and the remaining surface being provided with a cylinder shape.

The person skilled in the art realizes that the present invention by no means is limited to the preferred embodiments described above. On the contrary, many modifications and variations are possible within the scope of the appended claims.

Also, the skilled person readily realizes that the different embodiments described herein may be combined freely to obtain new combinations. For instance, a light emitting device according to the invention may comprise a combination of the different types of light guides described herein and/or a combination of different types of light sources.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:
1. A light emitting device comprising:
at least one first light source adapted for, in operation, emitting light with a first spectral distribution,
at least one second light source adapted for, in operation, emitting light with a second spectral distribution,
a first light guide comprising a first light input surface and a first light exit surface, the first light input surface and the first light exit surface extending at an angle different from zero with respect to each other, and
a second light guide comprising a second light input surface and a second light exit surface, the second light input surface and the second light exit surface extending at an angle different from zero with respect to each other,
the first light guide being configured for receiving the light with the first spectral distribution from the at least one first light source at the first light input surface, guiding the light in a longitudinal direction to the first light exit surface which is arranged at an end of the longitudinal direction, converting at least a part of the light with the first spectral distribution to light with a third spectral distribution and coupling at least a part of the light with the third spectral distribution out of the first light exit surface, and the second light guide being configured for receiving the light with the second spectral distribution from the at least one second light source at the second light input surface, guiding the light in a longitudinal direction to the second light exit surface which is arranged at an end of the longitudinal direction, converting at least a part of the light with the second spectral distribution to light with a fourth spectral distribution and coupling at least a part of the light with the fourth spectral distribution out of the second light exit surface, wherein the light having the third spectral distribution and the light having the fourth spectral distribution have different spectral distributions, wherein the first light guide and the second light guide are arranged extending parallel to one another and wherein the first light input surface and the second light input surface are arranged facing in opposite directions.

2. A light emitting device according to claim 1, wherein the first light guide comprises a material capable of converting at least a part of the light with the first spectral distribution to light with a third spectral distribution, and wherein the second light guide comprises a material capable of converting at least a part of the light with the second spectral distribution to light with the fourth spectral distribution.

3. A light emitting device according to claim 1, wherein the first light guide and the second light guide comprise any one of a transparent material, a luminescent material, a garnet and any combination thereof.

4. A light emitting device according to claim 1, wherein at least one of the first light guide and the second light guide is transparent and comprises a luminescent element arranged at a surface of the at least one of the first light guide and the second light guide.

5. A light emitting device according to claim 1, wherein the first light guide furthermore is adapted for coupling at least a part of the light with the third spectral distribution out of a surface which extends parallel to and is opposite to the first light exit surface.

6. A light emitting device according to claim 1, wherein the second light guide furthermore is adapted for coupling at least a part of the light with the fourth spectral distribution out of a surface which extends parallel to and is opposite to the second light exit surface.

7. A light emitting device according to claim 1, wherein at least one of the first light guide and the second light guide comprise a surface roughness of any one of less than 500 nm, less than 100 nm and less than 50 nm.

8. A light emitting device according to claim 1, further comprising an optical element arranged at the first and second light exit surface for mixing light exiting from the first light exit surface with light exiting from the second light exit surface.

9. A light emitting device according to claim 1, and further comprising one or more further light guides, comprising a further light input surface and a further light exit surface, the further light input surface and the further light exit surface extending at an angle different from zero with respect to each other, the one or more further light guides being adapted for receiving and coupling in incident light at the further light input surface, guiding the incident light in a longitudinal direction to the further light exit surface which is arranged at an end of the longitudinal direction, converting at least a part of the incident light to converted light with a spectral distribution being different from that of the incident light and coupling the converted light out of the further light exit surface, further comprising at least one further light source adapted for, in operation, emitting light with a further spectral distribution, the one or more further light guides being adapted for receiving and coupling in the light with further spectral distribution, and wherein the further light guide is arranged such that a surface extending parallel and opposite to the further light input surface is arrange extending adjacent to the first light input surface of the first light guide.

10. A light emitting device according to claim 9, wherein the further light guide comprises a length defined as a shortest distance between the further light exit surface and a surface opposite to the further light exit surface which is smaller than that of the first and second light guides.

11. A lamp, luminaire or digital projection device comprising a light emitting device according to claim 1.

12. A light emitting device according to claim 1, the light emitting device comprising multiple first light sources and multiple second light sources.

13. A light emitting device according to claim 1, wherein the first light guide and the second light guide are separated by a gap parallel and opposite to the first and second light input surfaces.

14. A light emitting device according to claim 1, wherein a shielding member is arranged between the first light guide and the second light guide to shield the light emitted by the at least one first light source and/or the light converted by the first light guide from the light emitted by the at least one second light source and/or the light converted by the second light guide.

* * * * *